(12) United States Patent
Carlins et al.

(10) Patent No.: US 11,260,513 B2
(45) Date of Patent: Mar. 1, 2022

(54) POWERED FASTENING DEVICE WITH DEPTH SHUTOFF

(71) Applicant: Klein Tools, Inc., Lincolnshire, IL (US)

(72) Inventors: Zachary Carlins, Chicago, IL (US); John H. Kargenian, Prospect Heights, IL (US)

(73) Assignee: Klein Tools, Inc., Lincolnshire, IL (US)

( * ) Notice: Subject to any disclaimer, the term of this patent is extended or adjusted under 35 U.S.C. 154(b) by 111 days.

(21) Appl. No.: 16/569,761

(22) Filed: Sep. 13, 2019

(65) Prior Publication Data

US 2021/0078150 A1    Mar. 18, 2021

(51) Int. Cl.
*B25C 5/15* (2006.01)
*B25C 5/16* (2006.01)
*F16B 15/08* (2006.01)
*F16B 15/00* (2006.01)

(52) U.S. Cl.
CPC ............. *B25C 5/15* (2013.01); *B25C 5/1696* (2013.01); *F16B 15/0015* (2013.01); *F16B 15/08* (2013.01)

(58) Field of Classification Search
CPC ................................ B25C 5/15; B25C 5/1696
See application file for complete search history.

(56) References Cited

U.S. PATENT DOCUMENTS

| | | | | |
|---|---|---|---|---|
| 5,263,626 A * | 11/1993 | Howard | ................... | B25C 1/188 227/142 |
| 5,385,286 A * | 1/1995 | Johnson, Jr. | ............ | B25C 1/047 227/8 |
| 5,685,473 A * | 11/1997 | Shkolnikov | ............. | B25C 1/008 227/142 |
| 5,839,638 A * | 11/1998 | Ronn | ...................... | B25C 1/008 227/8 |
| 5,927,585 A * | 7/1999 | Moorman | ................. | B25C 1/06 227/132 |
| 6,012,622 A * | 1/2000 | Weinger | .................. | B25C 1/005 227/8 |
| 6,170,729 B1 * | 1/2001 | Lin | ......................... | B25C 1/008 227/142 |
| 6,581,815 B1 * | 6/2003 | Ho | .......................... | B25C 1/008 227/142 |
| 6,883,696 B1 * | 4/2005 | Steinbrunner | .......... | B25C 1/008 227/142 |
| 6,988,648 B2 * | 1/2006 | Taylor | ..................... | B25C 1/008 227/142 |
| 7,097,084 B2 * | 8/2006 | Ho | .......................... | B25C 1/008 227/142 |
| 7,213,732 B2 * | 5/2007 | Schell | ..................... | B25C 1/008 227/142 |
| 7,213,733 B1 * | 5/2007 | Wen | ........................ | B25C 1/008 227/142 |
| 8,746,526 B2 * | 6/2014 | Hlinka | .................... | B25C 1/008 227/8 |
| 9,126,318 B2 * | 9/2015 | Cheung | .................... | B25C 1/00 |
| 9,427,857 B2 * | 8/2016 | Kok | .......................... | B25C 1/08 |
| 10,695,898 B2 * | 6/2020 | Liu | ........................ | B25C 1/008 |
| 2006/0000863 A1 * | 1/2006 | McGee | .................. | B25C 1/008 227/8 |

(Continued)

*Primary Examiner* — Thomas M Wittenschlaeger
*Assistant Examiner* — Katie L Gerth

(57) ABSTRACT

A powered fastening device is provided and is capable of applying multiple strikes to a fastener to drive the fastener to a preselected depth in a work piece and then automatically stopping the strikes when the preselected depth has been achieved.

13 Claims, 4 Drawing Sheets

(56) References Cited

U.S. PATENT DOCUMENTS

| | | | | |
|---|---|---|---|---|
| 2006/0065692 A1* | 3/2006 | Taylor | B25C 1/08 | 227/142 |
| 2006/0255085 A1* | 11/2006 | Wen | B25C 1/008 | 227/8 |
| 2007/0057006 A1* | 3/2007 | Moore | B25C 1/008 | 227/8 |
| 2007/0090149 A1* | 4/2007 | Segura | B25C 1/008 | 227/142 |
| 2007/0272422 A1* | 11/2007 | Coleman | B25C 1/06 | 173/1 |
| 2008/0099525 A1* | 5/2008 | Brendel | B25C 1/008 | 227/8 |
| 2008/0179371 A1* | 7/2008 | Gardner | F16L 3/04 | 227/1 |
| 2008/0185417 A1* | 8/2008 | Brendel | B25C 1/06 | 227/110 |
| 2009/0057366 A1* | 3/2009 | Braddock | B25C 1/06 | 227/120 |
| 2010/0065603 A1* | 3/2010 | Liu | B25C 1/008 | 227/142 |
| 2010/0237124 A1* | 9/2010 | Shima | B25C 1/06 | 227/8 |
| 2010/0327037 A1* | 12/2010 | Zhang | B25C 1/008 | 227/8 |
| 2013/0233903 A1* | 9/2013 | Brendel | B25C 5/00 | 227/129 |
| 2013/0320059 A1* | 12/2013 | Gregory | B25C 1/005 | 227/8 |
| 2013/0320062 A1* | 12/2013 | Segura | B25C 1/005 | 227/109 |
| 2017/0217004 A1* | 8/2017 | Kato | B25C 5/15 | |
| 2017/0361441 A1* | 12/2017 | Namouz | B25C 1/04 | |
| 2019/0152034 A1* | 5/2019 | Kargenian | B25C 5/15 | |
| 2019/0337135 A1* | 11/2019 | Kargenian | B25C 1/006 | |
| 2019/0381644 A1* | 12/2019 | Vandenberg | B25C 1/06 | |

* cited by examiner

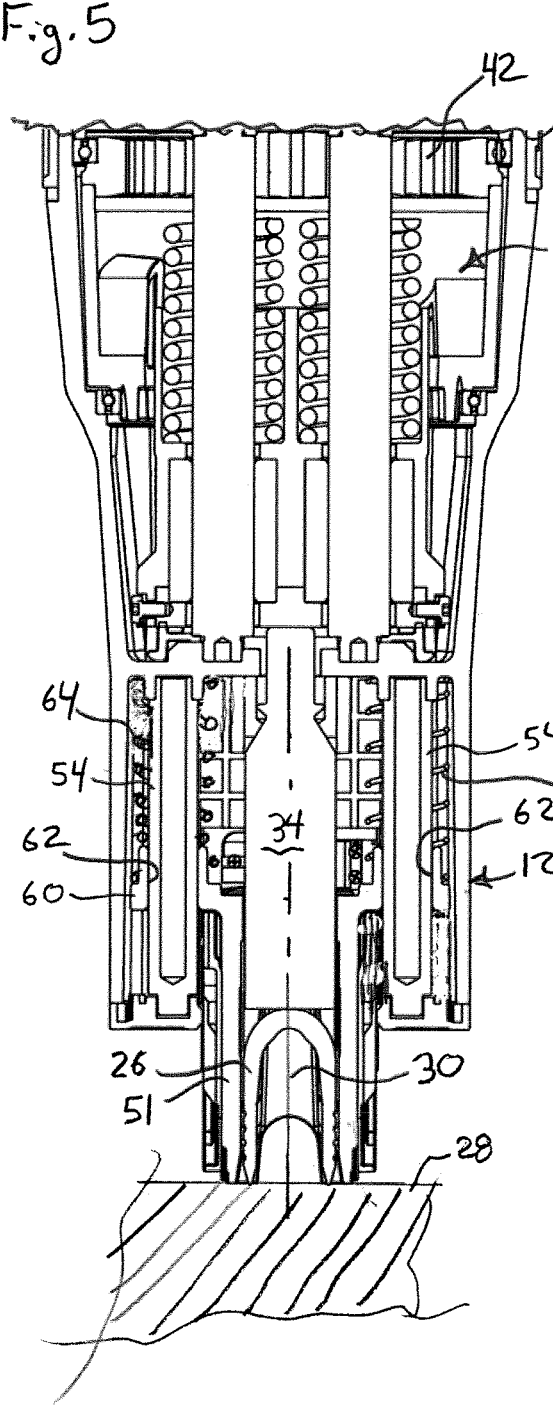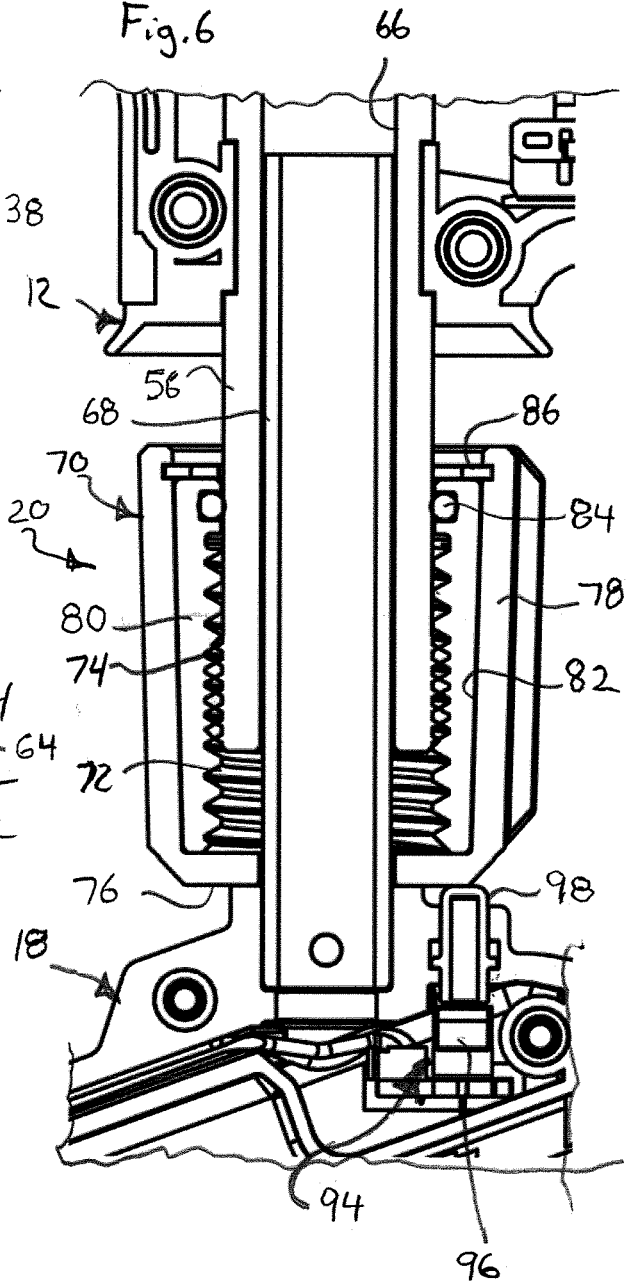

POWERED FASTENING DEVICE WITH DEPTH SHUTOFF

CROSS-REFERENCE TO RELATED APPLICATIONS

None

BACKGROUND OF THE DISCLOSURE

The present disclosure relates to tools, and, more particularly, to powered tools for driving staples or similar fasteners.

Powered fastening devices for driving staples or similar fasteners are known, including for driving heavy-duty utility fasteners in the forms of staples or similar fasteners. Such devices are powered in a variety of ways, including gas-powered, hydraulic powered, pneumatically powered, and electric powered by either a power cord or battery. Such devices concentrate force onto a striking member that drives a fastener into a work piece. Depending upon the power of the fastening device, the type and configuration of fastener, and the material of the work piece, a single driving stroke is typically sufficient to drive a fastener to a desired depth in a work piece for common applications, but in the field of heavy-duty utility fastening it is more difficult to drive the fastener to a desired depth with a single strike. Furthermore, it is difficult to control the depth to which the fastener is driven with a single strike.

In the electrical utility field, it is common to affix cables, wires and/or plastic moldings/wire protectors with large staples driven into utility poles and other structural members of an electrical distribution system, often in remote locations where standard 110-volt power sources are unavailable. Currently, the preferred method of accomplishing this task in the electrical utility field is to use a common hammer to drive U-shaped nails or staples into the structural members, which is a time consuming and often difficult process because of the likelihood of a mishit or deformation of the staple when attempting to strike the rounded surface of the staple with the hammer. The task is even more complicated by the desire to avoid pinching or crushing a cable or wire between a fastener and a utility pole or other structure when driving the fastener into the structure. Accordingly, there is a continuing need for improved fastening methods and devices to affix cables or wires to utility poles and other structural members.

U.S. patent application Ser. No. 16/405,381 filed on May 7, 2019 and naming John Kargenian et. al. as inventors (the entire disclosure of which is incorporated herein by reference) discloses a response to the above identified need in the form of a powered fastening device that is capable of multiple strikes to drive a fastener into a work piece while controlling the depth to which the fastener is driven so as to avoid pinching or crushing a cable or wire that is being joined to a structure by the fastener. While the disclosed device provides significant advantages, there is always room for improvement.

BRIEF SUMMARY OF THE DISCLOSURE

In accordance with one feature of this disclosure, a powered fastening device includes a main housing, a fastener drive assembly, a drive motor, a feeder assembly, an adjustable depth selector, and a motor control. The fastener drive assembly is carried in the main housing to drive a fastener into a work piece along a drive axis. The drive motor is carried in the main housing and operably connected to the fastener drive assembly to actuate the fastener drive assembly. The feeder assembly is configured to carry a plurality of fasteners and to sequentially position each fastener of the plurality of fasteners relative to the fastener drive assembly to be driven by the fastener drive assembly into a work piece. The feeder assembly is mounted to the main housing to translate along the drive axis relative to the fastener drive assembly between a start position and a stop position as a fastener is driven into a work piece. The adjustable depth selector is carried between the main housing and the feeder assembly to selectively adjust the location of the stop position along the drive axis to control how deep a fastener from the feeder assembly can be driven into a work piece by the fastener drive assembly. The motor control is operably connected to the drive motor and is configured to disable the drive motor in response to the feeder assembly translating to the stop position.

In one feature, the motor control includes a user actuated trigger switch, and the motor control is configured to enable the drive motor in response to user actuation of the trigger switch.

As one feature, the motor control further includes a mechanically actuated switch, the mechanically actuated switch having an unactuated condition and an actuated condition. The powered fastening device further includes a switch-actuating member located to actuate the mechanically actuated switch from one of the actuated and unactuated conditions to the other of the actuated and unactuated conditions with the feeder assembly in the stop position. The motor control is configured to enable the drive motor with the mechanically actuated switch in the one of the actuated and unactuated conditions and to disable the drive motor in response to the mechanically actuated switch being maintained in the other of actuated and unactuated conditions for a predetermined time period.

According to one feature, the mechanically actuated switch is fixed on the feeder assembly, and the switch-actuating member is part of the adjustable depth selector.

As a further feature, the adjustable depth selector includes a rotatable selection knob positioned between the feeder assembly and the main housing. In yet a further feature, the rotatable selection knob has a distal end that abuts the feeder assembly with the feeder assembly in the stop position. The distal end includes the switch-actuating member.

In one feature, the powered fastening device further includes an elongate rail extending between the main housing and the feeder assembly to mount the feeder assembly for translation along the drive axis relative to the fastener drive assembly. In a further feature, the adjustable depth selector includes a rotatable selection knob surrounding a portion of the elongate rail between the feeder assembly and the main housing. As yet a further feature, the rotatable selection knob is in threaded engagement with the elongate rail and has a distal end that abuts the feeder assembly with the feeder assembly in the stop position. The distal end includes the switch-actuating member.

As one feature, the mechanically actuated switch includes a switch body and an input member mounted on the switch body to move between an unactuated position and an actuated position, with the switch changing from the unactuated condition to the actuated condition in response to the input member moving from the unactuated position to the actuated position.

According to one feature, the motor control further includes a mechanically actuated switch, the mechanically actuated switch having an unactuated condition and an actuated condition. The powered fastening device further includes a switch-actuating member located to actuate the mechanically actuated switch from one of the actuated and unactuated conditions to the other of the actuated and unactuated conditions with the feeder assembly in the stop position. The motor control is configured to enable the drive motor with the mechanically actuated switch in the one of the actuated and unactuated conditions and to disable the drive motor in response to the passage of a predetermined time period after the mechanically actuated switch is initially actuated to the other of actuated and unactuated conditions.

As one feature, the motor is an electric motor and the fastener drive assembly includes a drive pin mounted to translate relative to the main housing to strike a fastener positioned in the feeder assembly to drive the fastener into a work piece. In a further feature, the motor is operable connected to the fastener drive assembly by a percussive assembly configured to strike the drive pin at regular intervals.

In one feature, the feeder assembly includes a fastener magazine configured to carry the plurality of fasteners, and a fastener nozzle configured to sequentially receive individual fasteners from the magazine and to sequentially position each fastener relative to the fastener drive assembly to be driven into a work piece by the fastener drive assembly.

In accordance with one feature of this disclosure, a powered fastening device includes a main housing, a fastener drive assembly, a drive motor, a feeder assembly, an adjustable depth selector, a motor control, and a switch actuating member. The fastener drive assembly is carried in the main housing to drive a fastener into a work piece along a drive axis. The drive motor is carried in the main housing and operably connected to the fastener drive assembly to actuate the fastener drive assembly. The feeder assembly is configured to carry a plurality of fasteners and to sequentially position each fastener of the plurality of fasteners relative to the fastener drive assembly to be driven by the fastener drive assembly into a work piece. The feeder assembly is mounted to the main housing to translate along the drive axis relative to the fastener drive assembly between a start position and a stop position as a fastener is driven into a work piece. The adjustable depth selector is carried between the main housing and the feeder assembly to selectively adjust the location of the stop position along the drive axis to control how deep a fastener in the feeder assembly can be driven into a work piece by the fastener drive assembly. The motor control is operably connected to the drive motor and includes a mechanically actuated switch, the mechanically actuated switch having an unactuated condition and an actuated condition. The switch actuating member is located to actuate the mechanically actuated switch from one of the actuated and unactuated conditions to the other of the actuated and unactuated conditions with the feeder assembly in the stop position. The motor control is configured to enable the drive motor with the mechanically actuated switch in the one of the actuated and unactuated conditions and to disable the drive motor in response to the mechanically actuated switch being maintained in the other of the actuated and unactuated conditions for a predetermined time period.

According to one feature, the motor control includes a user actuated trigger switch, and the motor control is configured to energize the drive motor in response to user actuation of the trigger switch.

As one feature, the mechanically actuated switch is fixed on the feeder assembly, and the switch-actuating member is part of the adjustable depth selector.

In one feature, the adjustable depth selector includes a rotatable selection knob positioned between the feeder assembly and the main housing. The rotatable selection knob has a distal end that abuts the feeder assembly with the feeder assembly in the stop position, and the distal end includes the switch-actuating member.

In accordance with one feature of this disclosure, a powered fastening device includes a main housing, a fastener drive assembly, a drive motor, a feeder assembly, and a motor control. The fastener drive assembly is carried in the main housing to drive a fastener into a work piece along a drive axis. The drive motor is carried in the main housing and operably connected to the fastener drive assembly to actuate the fastener drive assembly. The feeder assembly is configured to carry a plurality of fasteners and to sequentially position each fastener of the plurality of fasteners relative to the fastener drive assembly to be driven by the fastener drive assembly into a work piece. The feeder assembly is mounted to the main housing to translate along the drive axis relative to the fastener drive assembly between a start position and a stop position as a fastener is driven into a work piece. The motor control is operably connected to the drive motor and configured to disable the drive motor in response to the feeder assembly translating to the stop position.

As one feature, the motor control includes a user actuated trigger switch and a mechanically actuated switch, the mechanically actuated switch having an unactuated condition and an actuated condition. The motor control is configured to energize the drive motor in response to user actuation of the trigger switch; to enable the drive motor with the mechanically actuated switch in the one of the actuated and unactuated conditions; and to disable the drive motor in response to the mechanically actuated switch being maintained in the other of actuated and unactuated conditions for a predetermined time period.

It should be understood that the inventive concepts disclosed herein do not require each of the features discussed above, may include any combination of the features discussed above, and may include features not specifically discussed above.

BRIEF SUMMARY OF THE SEVERAL VIEWS OF THE DRAWINGS

FIG. 5 is a section view taken generally from line 5-5 in FIG. 2; and FIG. 6 is an enlarged partial view of a portion of the device indicated by line 6-6 in FIG. 4.

DETAILED DESCRIPTION OF PREFERRED EMBODIMENTS

Figure 1:
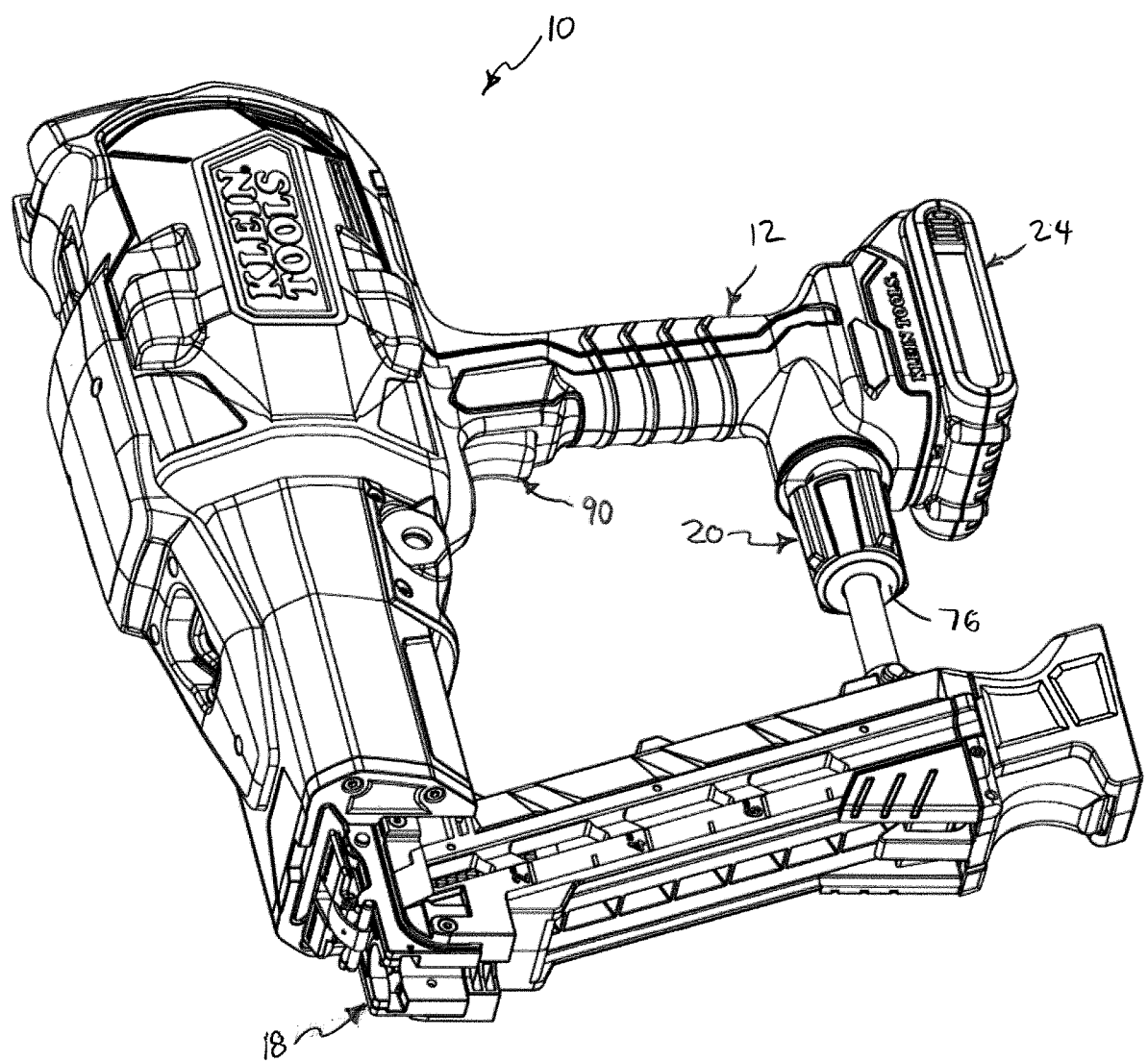
FIG. 1 is a perspective view from below and to the front/left of a powered fastening device according to this disclosure.
Figure 2:
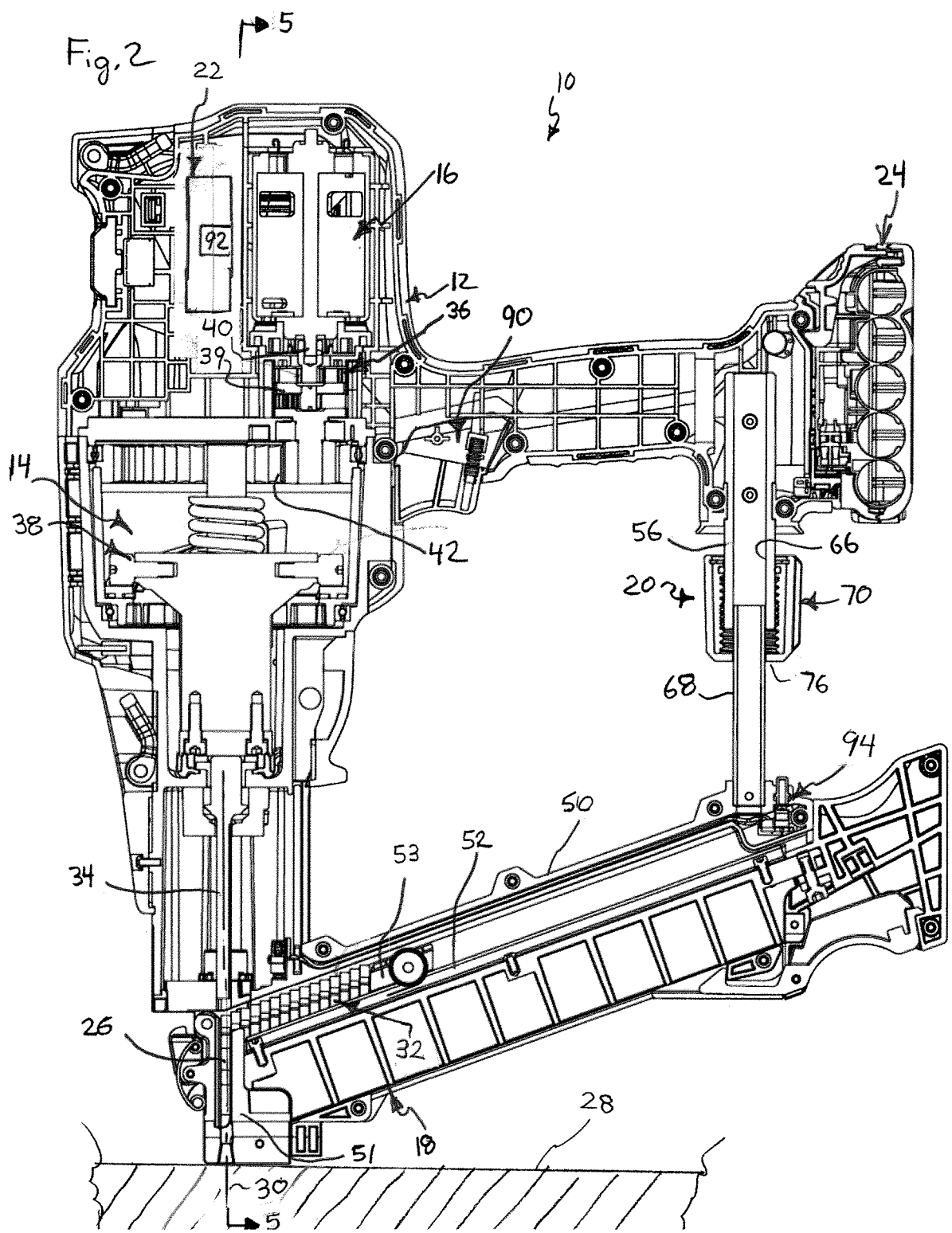
FIG. 2, is a longitudinal cross-section of the fastening device of FIG. 1, showing a fastener feeder assemble in an initial or start position.

As best seen in FIGS. 1 and 2, a powered fastening device 10 is provided and is capable of applying multiple strikes to a fastener to drive the fastener to a preselected depth in a work piece and automatically stopping the strikes the when the preselected depth has been achieved. As best seen in FIG. 2, the fastening device 10 in the illustrated embodiment is a battery powered, heavy duty/utility staple driver and the device 10 includes a main housing 12, a fastener drive assembly 14, a drive motor 16, a fastener feeder assembly 18, an adjustable depth selector 20, and a motor control shown diagrammatically at 22 but having components mounted at several different locations in the device 10. In the illustrated and preferred embodiment, the drive motor 16 is a brushed dc electric motor 16 and the device 10 includes a power supply in the form of a rechargeable battery 24 operably connected to the motor 16 via the motor control 22. The rechargeable battery 24 is releasably connected to the housing 12 and may be of any suitable configuration, many of which are known.

The fastener drive assembly 14 is carried in the housing 12 to drive a fastener 26 into a work piece 28 along a drive axis 30. The drive motor 16 is carried in the housing 12 and operably connected to the fastener drive assembly 14 to actuate the fastener drive assembly 14. The feeder assembly 18 is configured to carry a joined collation 32 of fasteners 26 and to sequentially position/locate each fastener 26 relative to the fastener drive assembly 14 so that the fastener 26 can be driven by the fastener drive assembly 14 into the work piece 28. The feeder assembly 18 is mounted to the housing 12 to translate along the drive axis 30 relative to the fastener drive assembly 14 between a start position (shown in FIGS. 1 and 2) and a stop position (shown in FIGS. 3 and 4) as a fastener 26 is driven into the work piece 28. The adjustable depth selector 20 is carried between the housing 12 and the feeder assembly 18 to selectively adjust the location of the stop position along the drive axis 30 to control how deep a fastener 26 from the feeder assembly 18 can be driven into the work piece 28 by the fastener drive assembly 14. As will be explained in greater detail below, the motor control 22 is operably connected to the drive motor 16 and is configured to disable the drive motor 16 in response to the feeder assembly 18 translating to the stop position.

In the illustrated embodiment, the fastener drive assembly 14 includes a drive pin or punch 34 mounted to reciprocate relative to the housing 12 and the feeder assembly 18 along the drive axis 30 to strike a fastener 26 positioned in the feeder assembly 14 to drive the fastener 26 into the work piece 28. The drive motor 16 is operably coupled to the drive pin 34 by a gear train 36 and a percussive assembly 38. In the illustrated embodiment, the gear train 36 includes a planetary gear system 39 that transfers a drive torque from an output shaft 40 of the motor 16 to an input gear 42 of the percussive assembly 38. In response to the drive torque from the motor 16, the percussive assembly 38 is configured to strike the drive pin 34 at regular intervals to transfer an impact energy at each interval that drives the fastener 26 into the work piece 28. Further details of the illustrated and preferred configuration for the drive motor 16, gear train 36, and percussive assembly 38 are shown and described in FIGS. 3-7 and paragraphs [0034]-[0046] of U.S. patent application Ser. No. 16/192,379 filed Nov. 15, 2018 naming Kargenian et al. as inventor, the entire disclosure of which is incorporated herein by reference. While one preferred configuration is shown herein, it should be understood that any suitable drive motor 16, gear train 36, and/or percussive assembly 38 can be utilized with the inventive concepts disclosed herein; that the details of these components are not critical to understanding those inventive concepts; and that no limitation to any specific form or configuration for a percussive assembly is intended unless expressly recited in an appended claim. In this regard, some other examples of suitable drive motors, gear trains, and percussive assemblies are shown in the aforementioned and incorporated U.S. patent application Ser. Nos. 16/405,381 and 16/192,379.

As best seen in FIG. 2, the feeder assembly 18 includes a fastener magazine 50 and a fastener nozzle 51. The fastener magazine 50 is configured to carry the collation 32 of fasteners 26 and to sequentially load the fasteners 26 into the fastener nozzle 51. In this regard, the magazine 50 includes an elongate guide track 52 that guides the collation 32 toward the nozzle 51 and a spring biased ram 53 that pushes the collation 32 into the nozzle 51, as is known for many common staplers and staple guns. The fastener nozzle 51 is configured to sequentially receive individual fasteners 26 from the magazine 50 and to sequentially position each fastener 26 relative to the fastener drive assembly 14 to be driven into a work piece 28 by the fastener drive assembly 14. It should be understood that while a preferred embodiment is shown and described herein, the inventive concepts of this disclosure do not depend on the specific form, configuration, or construction of the feeder assembly 18 and any suitable form, construction, or configuration, many of which are known, can be used for the feeder assembly 18 to sequentially position a fastener, including fasteners other than staples, relative to the fastener drive assembly 14 to allow the drive assembly 14 to drive the fastener into a work piece.

In the illustrated and preferred embodiment, the feeder assembly 18 is mounted to the main housing 12 by a pair of elongate, cylindrical guide rails 54 located adjacent the front of the device 10 and an elongate, cylindrical guide rail 56 located adjacent the rear of the device 10, as best seen in FIGS. 2 and 5. As best seen in FIG. 5, the rails 54 are identical to each other and are fixed in the main housing 12. The feeder assembly 18 includes a carriage 60 defining the fastener nozzle 51 and having a pair of guide bores 62, each sized to slidably receive the corresponding rail 54 for guided translation of the carriage 60 and the feeder assembly 18 parallel to the drive axis 30 relative to the main housing 12 and the fastener drive assembly 14. A pair of helical compression springs 64 are located between the carriage 60 and the main housing 12 to bias the feeder assembly 18 away from the main housing 12 and the drive assembly 14, with each of the springs 64 extending concentrically over one of the rails 54. As best seen in FIG. 2, the rail 56 is fixed in the housing 12 and has a cylindrical bore 66 that slidably receives an elongate, cylindrical guide rail 68 that is fixed to the feeder assembly 18 for guided translation of the feeder assembly 18 parallel to the drive axis 30 relative to the main housing 12 and the fastener drive assembly 14.

Figure 3:
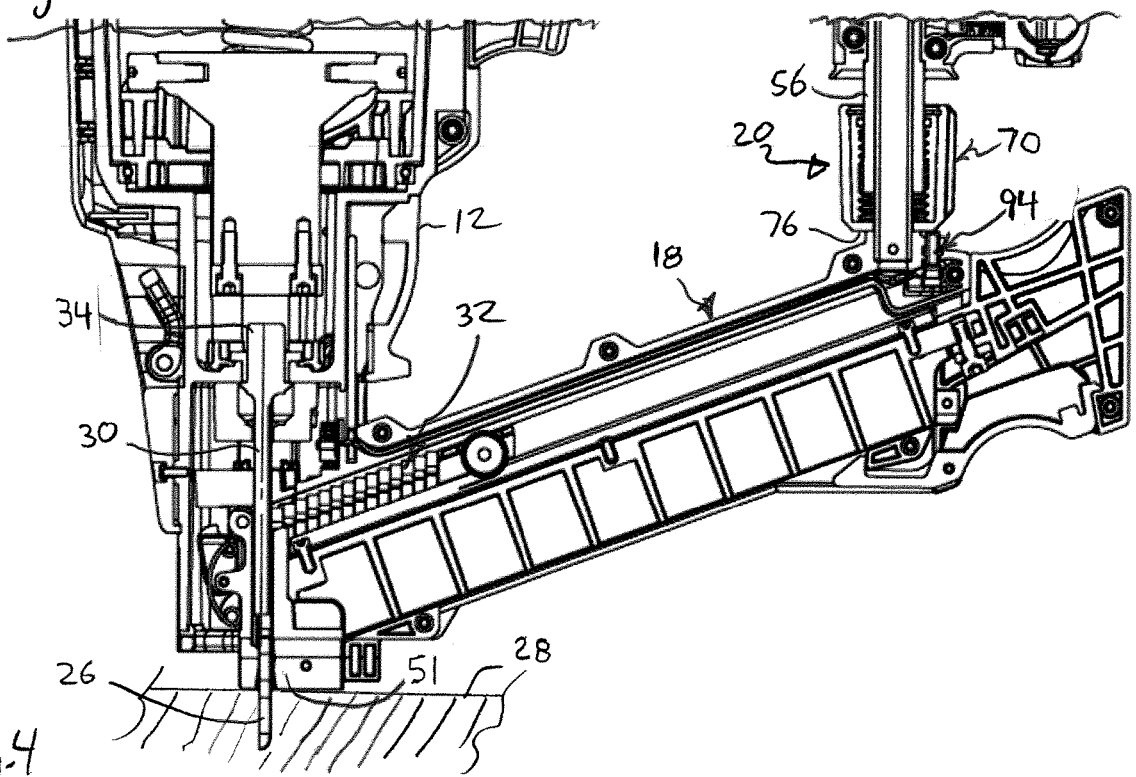
FIG. 3 is a partial view similar to FIG. 2, but showing the fastener feeder assembly in a stop position with a fastener driven to less than a desired depth in a work piece.
Figure 4:
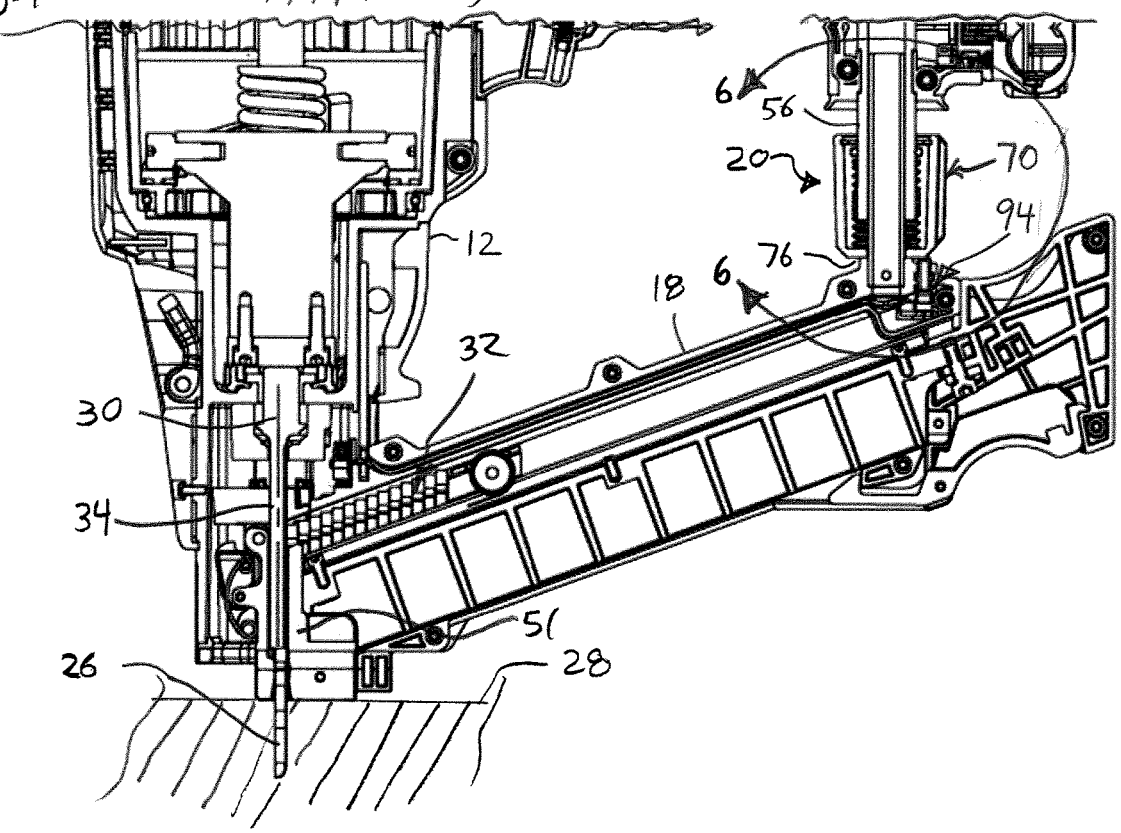
FIG. 4 is a view similar to FIG. 3 but showing the fastener driven fully to the desired depth in a work piece.

As best seen in FIG. 6, in the illustrated embodiment, the adjustable depth selector 20 includes a rotatable knob unit 70 that surrounds the rail 56 and has internal screw threads 72 that are engaged with external screw thread 74 on the rail 56. The interaction of the threads 72 and 74 allow a user to adjust the relative position between the knob unit 70 and the rail 56 and housing 12 by rotating the knob unit 70 either clockwise or counterclockwise. As best seen in FIGS. 3, 4, and 6, in the stop position, a distal end 76 of the knob unit 70 abuts the feeder assembly 18 to limit the translation of the feeder assembly 18 relative to housing 12 and the drive assembly 14 along the drive axis 30, which in turn controls the depth to which a fastener 26 is driven into the work piece 28. In the illustrated embodiment, the knob unit 70 includes an outer knob 78 and a threaded insert 80 that is received within an open recess 82 of the knob 78, with the threaded insert 80 and the recess 82 having conforming shapes that prevent rotation of the insert 80 relative to the knob 78. An O-ring 84 is mounted in the insert 80 and compressed between the insert 80 and the exterior of the rail 56 to provide a frictional engagement that resists undesired rotation of the knob unit 70 relative to the rail 56 due to vibration while a fastener 26 is being driven into the work piece 28 by the device 10. A snap ring 86 is engaged in the knob 78 to retain the insert 80 in the recess 82. The rails 54, 56, and 68, the carriage 60, and the threaded insert 80 are preferably made from a suitable steel or other metal, and the outer knob 78 is preferably molded from a suitable polymeric or composite material.

As best seen in FIG. 2, in the illustrated and preferred embodiment, the motor control 22 includes a user actuated trigger switch 90 and the motor control 22 is configured to energize the drive motor 16 in response to user actuation of the trigger switch 90, as is known. In the illustrated embodiment, the motor control 22 also includes a microprocessor or microcontroller 92 and a mechanically actuated switch 94 that signals when the fastener 26 has been driven to the desired depth so that the motor control 22 can automatically disable the motor 16 even when the trigger switch 90 is signaling that the motor 16 should be enabled. This feature minimizes unnecessary impacts on the drive pin 34 and other components of the fastener drive assembly 14, thereby reducing wear and tear on the components of the device 10, particularly wear and tear on the fastener drive assembly 14. In further detail of this feature, the switch 94 has an unactuated condition (best seen in FIG. 2) and an actuated condition (best seen in FIGS. 3, 4, and 6) and the motor control 22 is configured to enable the drive motor 16 with the switch 94 in the unactuated condition and to disable the drive motor 16 with the switch 94 in the actuated condition. For example, in the actuated condition, the switch 94 could simply break the electrical connection between the motor 16 and the power supply 24, or the switch 94 could signal the microcontroller 92 to disable the motor 16. In the illustrated and preferred embodiment, the microcontroller 92 can be of any suitable type of computing process unit and is mounted on a printed circuitry board with any required supporting electronic components, such as memory, many of which are known to those skilled in the art.

As best seen in FIG. 6, in the illustrated and preferred embodiment, the switch 94 includes a switch body 96 and an input member 98 mounted to move between an unactuated position (shown in FIG. 2) and an actuated position (shown in FIGS. 3, 4, & 6), with the input member 98 being biased to the unactuated position. The switch 94 changes from the unactuated condition to the actuated condition in response to the input member 98 moving from the unactuated position to the actuated position. The switch 94 changes from the actuated condition to the unactuated condition in response to the input member 98 moving from the actuated position to the unactuated position. In the illustrated embodiment, the switch body 96 is fixed in the feeder assembly 18, and the powered fastening device 10 includes a switch-actuating member in the form of the distal end 76 of the knob 78, which is located to actuate the mechanically actuated switch 94 between the actuated and unactuated conditions by contacting the input member 98. In the illustrated embodiment, the actuating member 76 actuates the switch 94 from the unactuated condition to the actuated condition with the feeder assembly 14 in the stop position shown in FIGS. 3, 4, and 6.

While the illustrated embodiment is preferred, it should be understood that in some embodiments, the device 10 could be configured so that the switch-actuating member 76 actuates the switch 94 from the actuated condition to the unactuated condition with the feeder assembly 18 in the stop position, with the motor control 22 being configured to enable the drive motor 16 with the switch 94 in the actuated condition and to disable the drive motor 16 with the switch 94 in the unactuated condition.

In the illustrated embodiment, the switch 94 is operably connected to the microcontroller 92 to send signals representing the actuated or unactuated condition, and the microcontroller 92 is configured to disable the motor 16 in response to the switch 94 being maintained in the actuated condition for a predetermined time period. This is desirable because, in operation, the switch 94 can repeatedly move between the actuated and unactuated conditions as a fastener 26 is being driven into a work piece 26 because of the reciprocating action of the fastener drive assembly 14, which produces reciprocating action of the feeder assembly 14 relative to the housing 12 along the drive axis 30 until the fastener 26 is driven fully to the desired depth. This is illustrated by FIG. 3 which shows the feeder assembly 18 in the stop position and the switch 94 in the actuated condition, but the fastener 26 at less than the desired depth; and by FIG. 4 which shows the feeder assembly 18 again in the stop position, the switch 94 in the actuated condition, and the fastener 26 driven to the desired depth by additional impacts from the fastener drive assembly 14, with each additional impact potentially lifting the switch-actuating member 76 to a position where the switch 94 is placed in the unactuated condition. By waiting until the switch 94 has been maintained in the actuated condition for a predetermined time period, the motor control 22 can insure that the fastener 26 has been driven fully to the desired depth. If the motor control 22 is configured so that the motor 16 is to be disabled in response to the switch 94 being in the unactuated condition, the microcontroller 92 would be configured to disable the motor 16 in response to the switch 94 being maintained in the unactuated condition for a predetermined time period.

In an alternate embodiment, the microcontroller 92 is configured to disable the motor 16 in response to the passage of a predetermined time period after the switch 94 is initially actuated to the actuated condition. Again, this is desirable because it can take several additional impacts to fully drive a fastener 26 to the desired depth after the switch 94 is initially actuated to the actuated position.

In yet another alternate embodiment, the microcontroller 92 is configured to disable the motor 16 in response to a predetermined number of times the switch 84 is cycled between the actuated and unactuated conditions as a fastener is being driven into a work piece 26.

Preferred embodiments of the inventive concepts are described herein, including the best mode known to the inventor(s) for carrying out the inventive concepts. Variations of those preferred embodiments will become apparent to those of ordinary skill in the art upon reading the foregoing description. The inventor(s) expect skilled artisans to employ such variations as appropriate, and the inventor(s) intend that the inventive concepts can be practiced otherwise than as specifically described herein. Accordingly, the inventive concepts disclosed herein include all modifications and equivalents of the subject matter recited in the claims appended hereto as permitted by applicable law. Moreover, any combination of the above-described elements and features in all possible variations thereof is encompassed by the inventive concepts unless otherwise indicated herein or otherwise clearly contradicted by context. Further in this regard, while highly preferred forms of the fastening device 10 are shown in the figures, it should be understood that this disclosure anticipates variations in the specific details of each of the disclosed components and features of the fastening device 10 and that no limitation to a specific form, configuration, or detail is intended unless expressly and specifically recited in an appended claim.

For example, while specific and preferred forms have been shown for the switches 90 and 94, any suitable form or configuration can be used. In this regard, for example, the switch 94 could be provided with an input member that pivots between the unactuated and actuated conditions, rather than the translating input member 98 shown in the drawings. As a further example, the motor control 22 and switch 94 could be configured so that the switch 94 is in the unactuated condition when the feeder assembly 18 is in the stop position, with the motor 16 being disabled in response to the switch 94 being in the unactuated condition. As a further example, the drive motor 16 could be a brushless DC motor, rather than the brushed DC motor of the preferred embodiment. As another example, the power source could be an electrical cord that can be connected to an electrical outlet, rather than the battery 24 of the preferred embodiment. As yet another example, while the elongate rails 54, 56, and 68 are shown as cylindrical rails, other shapes or other methods of enabling the translation of the feeder assembly 18 may be desirable and employed with the inventive concepts disclosed herein. Similarly, more or fewer of the rails 54, 56 and/or 68 may be desirable. In a further example, while the preferred embodiment includes the adjustable depth selector 20, in some embodiments it may be desirable for the device 10 to not include that feature. As a further example, while the knob unit 70 and engaged threads 72 and 74 are preferred, in some embodiments it may be desirable for an adjustable member to be provided in a different form and/or in a different location in the device 10. As yet another example, the adjustable depth selector 20 could be engaged with the rail 68 and the switch 94 could be fixed in the main housing 12. As yet another example, the switch 94 and switch-actuating member could be located on other components of the device 10. In a further example, the switch 94 could be a non-mechanically actuated switch, such as a proximity switch or sensor.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. The use of any and all examples, or exemplary language (e.g., "such as") provided herein, is intended merely to better illuminate the inventive concepts disclosed herein and does not pose a limitation on the scope of any invention unless expressly claimed. No language in the specification should be construed as indicating any non-claimed element as essential to the practice of the inventive concepts disclosed herein.

All references, including publications, patent applications, and patents, cited herein are hereby incorporated by reference to the same extent as if each reference were individually and specifically indicated to be incorporated by reference and were set forth in its entirety herein.

What is claimed is:

1. A powered fastening device comprising:
   a main housing;
   a fastener drive assembly carried in the main housing to drive a fastener into a work piece along a drive axis;
   a drive motor carried in the main housing and operably connected to the fastener drive assembly to actuate the fastener drive assembly;
   a feeder assembly configured to carry a plurality of fasteners and to sequentially position each fastener of the plurality of fasteners relative to the fastener drive assembly to be driven by the fastener drive assembly into the work piece, the feeder assembly mounted to the main housing to translate along the drive axis relative to the main housing and the fastener drive assembly between a start position and a stop position as each fastener of the plurality of fasteners is driven into the work piece;
   an adjustable depth selector carried between the main housing and the feeder assembly to selectively adjust the location of the stop position along the drive axis to control how deep each fastener of the plurality of fasteners from the feeder assembly can be driven into the work piece by the fastener drive assembly; and
   a motor control operably connected to the drive motor, the motor control configured to disable the drive motor in response to the feeder assembly translating to the stop position; and wherein
   the motor control comprises a user actuated trigger switch, and the motor control configured to enable the drive motor in response to user actuation of the trigger switch;
   the motor control further comprises a mechanically actuated switch, the mechanically actuated switch having an unactuated condition and an actuated condition;
   the powered fastening device further comprises a switch-actuating member located to actuate the mechanically actuated switch from one of the actuated and unactuated conditions to the other of the actuated and unactuated conditions with the feeder assembly in the stop position; and
   the motor control is configured to enable the drive motor with the mechanically actuated switch in the one of the actuated and unactuated conditions and to disable the drive motor in response to the mechanically actuated switch being maintained in the other of actuated and unactuated conditions for a predetermined time period.

2. The powered fastening device of claim 1, wherein the mechanically actuated switch is fixed on the feeder assembly, and the switch-actuating member is part of the adjustable depth selector.

3. The powered fastening device of claim 2, wherein the adjustable depth selector comprises a rotatable selection knob positioned between the feeder assembly and the main housing.

4. The powered fastening device of claim 3, wherein the rotatable selection knob has a distal end that abuts the feeder assembly with the feeder assembly in the stop position, the distal end comprising the switch-actuating member.

5. The powered fastening device of claim 2, further comprising an elongate rail extending between the main housing and the feeder assembly to mount the feeder assembly for translation along the drive axis relative to the fastener drive assembly.

6. The powered fastening device of claim 5, wherein the adjustable depth selector comprises a rotatable selection knob surrounding a portion of the elongate rail between the feeder assembly and the main housing.

7. The powered fastening device of claim 6, wherein the rotatable selection knob is in threaded engagement with the elongate rail and has a distal end that abuts the feeder assembly with the feeder assembly in the stop position, the distal end comprising the switch actuating member.

8. The powered fastening device of claim 1, wherein the mechanically actuated switch comprises a switch body and an input member mounted on the switch body to move between an unactuated position and an actuated position, the switch changing from the unactuated condition to the actuated condition in response to the input member moving from the unactuated position to the actuated position.

9. A powered fastening device comprising:
a main housing;
a fastener drive assembly carried in the main housing to drive a fastener into a work piece along a drive axis;
a drive motor carried in the main housing and operably connected to the fastener drive assembly to actuate the fastener drive assembly;
a feeder assembly configured to carry a plurality of fasteners and to sequentially position each fastener of the plurality of fasteners relative to the fastener drive assembly to be driven by the fastener drive assembly into the work piece, the feeder assembly mounted to the main housing to translate along the drive axis relative to the main housing and the fastener drive assembly between a start position and a stop position as each fastener of the plurality of fasteners is driven into the work piece;
an adjustable depth selector carried between the main housing and the feeder assembly to selectively adjust the location of the stop position along the drive axis to control how deep each fastener in the feeder assembly can be driven into the work piece by the fastener drive assembly;
a motor control operably connected to the drive motor, the motor control comprising a mechanically actuated switch, the mechanically actuated switch having an unactuated condition and an actuated condition; and
a switch-actuating member located to actuate the mechanically actuated switch from one of the actuated and unactuated conditions to the other of the actuated and unactuated conditions with the feeder assembly in the stop position;
wherein the motor control is configured to enable the drive motor with the mechanically actuated switch in the one of the actuated and unactuated conditions and to disable the drive motor in response to the mechanically actuated switch being maintained in the other of the actuated and unactuated conditions for a predetermined time period.

10. The powered fastening device of claim 9, wherein the motor control comprises a user actuated trigger switch, and the motor control is configured to energize the drive motor in response to user actuation of the trigger switch.

11. The powered fastening device of claim 9, wherein the mechanically actuated switch is fixed on the feeder assembly, and the switch-actuating member is part of the adjustable depth selector.

12. The powered fastening device of claim 11, wherein the adjustable depth selector comprises a rotatable selection knob positioned between the feeder assembly and the main housing, the rotatable selection knob has a distal end that abuts the feeder assembly with the feeder assembly in the stop position, and the distal end comprises the switch-actuating member.

13. A powered fastening device comprising:
a main housing;
a fastener drive assembly carried in the main housing to drive a fastener into a work piece along a drive axis;
a drive motor carried in the main housing and operably connected to the fastener drive assembly to actuate the fastener drive assembly;
a feeder assembly configured to carry a plurality of fasteners and to sequentially position each fastener of the plurality of fasteners relative to the fastener drive assembly to be driven by the fastener drive assembly into the work piece, the feeder assembly mounted to the main housing to translate along the drive axis relative to the main housing and the fastener drive assembly between a start position and a stop position as each fastener of the plurality of fasteners is driven into the work piece; and
a motor control operably connected to the drive motor, the motor control configured to disable the drive motor in response to the feeder assembly translating to the stop position, the motor control comprising:
a user actuated trigger switch, and the motor control configured to energize the drive motor in response to user actuation of the trigger switch, and
a mechanically actuated switch, the mechanically actuated switch having an unactuated condition and an actuated condition; and
wherein the motor control is configured to enable the drive motor with the mechanically actuated switch in the one of the actuated and unactuated conditions and to disable the drive motor in response to the mechanically actuated switch being maintained in the other of actuated and unactuated conditions for a predetermined time period.

* * * * *